Figure 1:
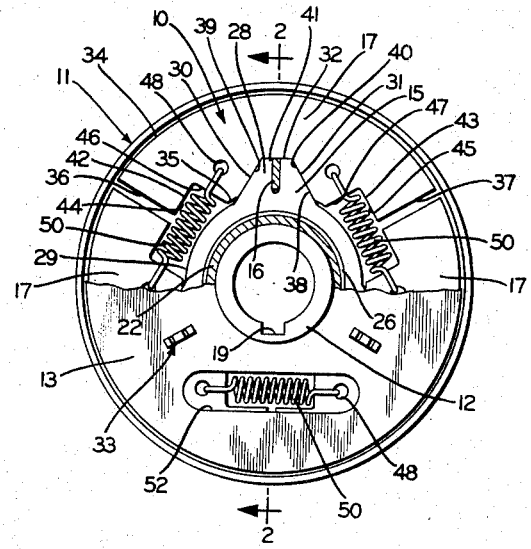

Jan. 13, 1959

N. V. SPROUL 2,868,343

CENTRIFUGAL CLUTCH CONSTRUCTION

Filed Feb. 8, 1956

2 Sheets-Sheet 1

INVENTOR.
Nolte V. Sproul
BY
Frease & Bishop
ATTORNEYS

Jan. 13, 1959  N. V. SPROUL  2,868,343
CENTRIFUGAL CLUTCH CONSTRUCTION
Filed Feb. 8, 1956  2 Sheets-Sheet 2

INVENTOR.
Nolte V. Sproul
BY Frease & Bishop
ATTORNEYS

United States Patent Office 2,868,343
Patented Jan. 13, 1959

2,868,343

CENTRIFUGAL CLUTCH CONSTRUCTION

Nolte V. Sproul, Massillon, Ohio, assignor to Automatic Steel Products, Inc., Canton, Ohio, a corporation of Delaware Application February 8, 1956, Serial No. 564,196

15 Claims. (Cl. 192—105)

My invention relates to improvements in centrifugal clutch construction and more specifically to the general classification of weight type clutches. Even more specifically, my invention relates to a centrifugal clutch construction providing both flexible and self-energizing features, whereby the construction comprising the present invention may be incorporated in either a coupling type or pulley type power transmitting clutch. Further, the clutch construction comprising the present invention is an improvement and modification of the clutch construction described and claimed in my co-pending application, Serial No. 430,470, filed May 18, 1954.

Certain prior constructions of weight type centrifugal clutches have been constructed to transmit a predetermined constant torque, that is, the friction shoes thereof are movable by centrifugal force between fixed limits, so that the torque which the clutch can transmit is a predetermined and constant amount. Thus, in the use of this prior clutch construction, if there is but a slight increase in the torque load through the clutch, the clutch will immediately begin to slip and ultimately destroy the friction material forming the friction shoes.

Attempts have been made to overcome this difficulty of a preset torque transmission capacity but most of these prior constructions have resulted in a so-called "lock-up" clutch. In the lock-up clutches, once the friction shoes have moved to torque transmitting position, the clutch will transmit any amount of torque within the limits of the strength of the metal parts which form the clutch construction, thereby eliminating any overload protection to the prime mover producing the torque which is transmitted through the clutch. Further, these lock-up clutch constructions having a "grabbing" effect at the point of engagement, thereby providing a very abrupt engagement and eliminating one of the prime features of a centrifugal clutch of giving delayed smooth engagement between a prime mover and a driven member.

A still further difficulty with prior weight type clutch constructions is that if a clutch engagement or release speed is desired near the running speed of the prime mover and driven member, the only way this high release speed can be obtained is by increasing the strength of the springs or other resilient members which control the radial movement of the friction shoes or members, caused by the centrifugal force. If stronger springs are used to obtain this high release speed, however, the maximum torque transmitting capacity of the clutch is accordingly reduced, so that if a high release speed, high torque capacity clutch is required, the size of the clutch must be increased. Thus, in a given size clutch if a greater torque capacity is needed, there is merely the alternative of providing weaker springs which will lower the release speed or using a clutch of greater size.

It is therefore a general object of the present invention to provide a centrifugal clutch construction which overcomes the difficulties of the prior constructions set forth above.

It is a primary object of the present invention to provide a centrifugal clutch construction of the weight type which does not positively lock up nor provide an abrupt engagement.

It is a further object of the present invention to provide a centrifugal clutch construction of the weight type which is flexible and self-energizing but yet provides overload protection.

It is still a further object of the present invention to provide a centrifugal clutch construction which includes a resilient spider member which is engaged with and transmits torque to the friction shoes or elements of the clutch.

Additionally, it is an object of the present invention to provide a centrifugal clutch construction which includes a resilient spider for transmitting torque to the friction shoes, but which is constructed so that there is a minimum stress on the spider as a result of such torque transmission.

It is another object of the present invention to provide a centrifugal clutch construction which includes a resilient spider for transmitting torque to the friction shoes, but which is constructed in such a way that highly resilient material may be used to form the spider without affecting such torque transmission.

It is still another object of the present invention to provide a centrifugal clutch construction having a plurality of friction shoes, which may incorporate either individual tension springs between adjoining friction shoes for regulating the radial movement thereof, caused by centrifugal force, or may incorporate a garter spring surrounding all of the friction shoes, with only a slight modification of the friction shoes being required for such substitution.

Further, it is an object of the present invention to provide a centrifugal clutch construction which includes means for cheaply and conveniently providing a clutch having a high release or engagement speed near the running speed of the device with which the clutch is used, but yet having a high torque transmitting capacity when engaged.

Still further, it is an object of the present invention to provide a centrifugal clutch construction which includes a resilient spider for transmitting torque to the friction shoes thereof, and also includes means for reducing friction between said spider and shoes.

Finally, it is an object of the present invention to provide a centrifugal clutch construction which accomplishes all of the above objects, yet is relatively simple in construction and economical to fabricate.

These and other objects are accomplished by the parts, constructions, arrangements, combinations and subcombinations comprising the present invention, the nature of which is set forth in the following general statement, preferred embodiments of which—illustrative of the best modes in which applicant has contemplated applying the principles—are set forth in the following description and illustrated in the accompanying drawings, and which are particularly and distinctly pointed out and set forth in the appended claims forming a part hereof.

In general terms, the improved centrifugal clutch construction comprising the present invention may be stated as including driving and driven member, with the driven member having a housing member surrounding the driving member, and with said housing being journaled on the driving member to provide a pulley type clutch or merely surrounding the driving member and not connected thereto, other than through engagement of the clutch, providing a coupling type clutch.

The driven member of the clutch construction preferably includes a hub member having a resilient generally cylindrical spider mounted thereon for rotation therewith. The spider is provided with circumferentially spaced radially extending projections formed on the outer circumferential surface thereof.

The spider preferably surrounds an axial portion of the hub member and is mounted thereon between spaced radially extending side plates which are preferably mounted on the hub by a press fit. Further, driving connection is maintained between the side plates and the spider by preferably axially extending lugs mounted between the side plates and passing through the projections on the spider.

The friction segments or shoes of the driving member are preferably formed with arcuate outer friction surface for engagement with the housing of the driven member. Further, these friction shoes are each provided with a recess formed therein in the inner circumferential surface thereof and substantially midway of the circumferential length thereof.

The friction shoes may also be provided with spring receiving recesses at the ends thereof adjacent the inner circumferential surfaces, or circumferentially extending grooves in the outer circumferential surfaces thereof. Thus, the friction shoes may be mounted on the spider with the projections of the spider received in the substantially central recesses of the shoes, and either a circular garter spring may be mounted surrounding all of the shoes and received in the circumferentially extending grooves thereof, or individual tension springs may be mounted in the end recesses of the shoes and resiliently connecting the shoes.

Additionally, when the friction shoes are formed with the circumferentially extending grooves in the outer circumferential surfaces thereof for reception of the circular garter spring, the end recesses of the shoes may be formed with angled surfaces providing tapered end portions on each of the shoes, and providing generally triangular recesses between adjacent shoes, decreasing in width as they extend radially outwardly. Metal wedge members, preferably cylindrical in configuration, may be mounted in these generally triangular recesses for providing increased torque transmitting capacity to the clutch.

Finally, shim members may be mounted over the projections on the resilient spider, between these projections and the friction shoe central recesses. Thus, upon rotation of the driving member, the friction shoes will move radially outwardly against the housing of the driven member, with torque being transmitted through the projections on the spider to the friction shoes and ultimately to the housing member, and with the shim members reducing friction between the spider projections and the friction shoes during this engagement.

Figure 2:
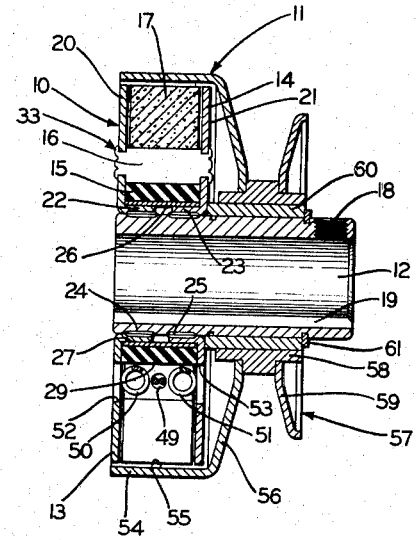
Figure 3:
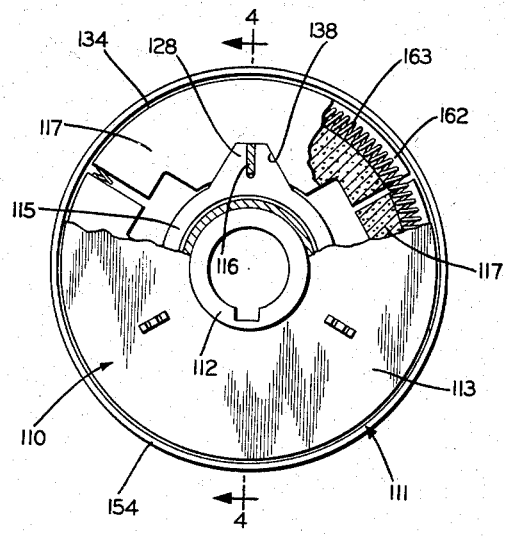
Figure 4:
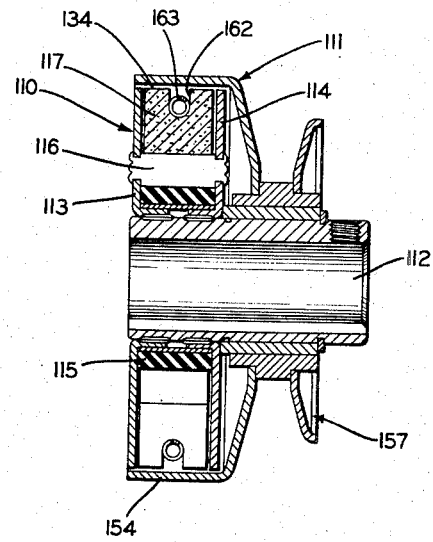
Figure 5:
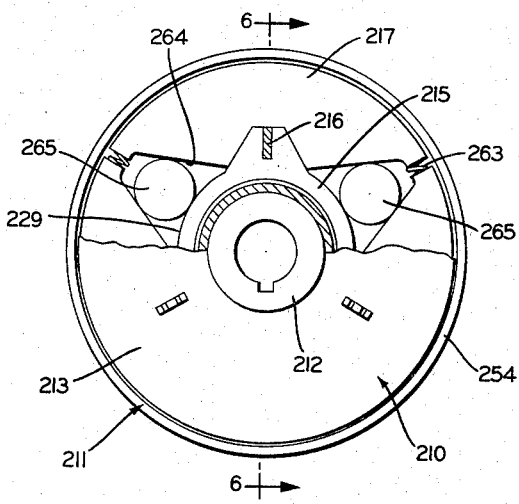
Figure 6:
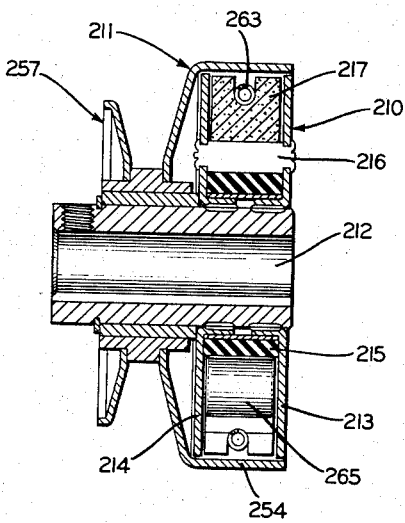
Figure 7:
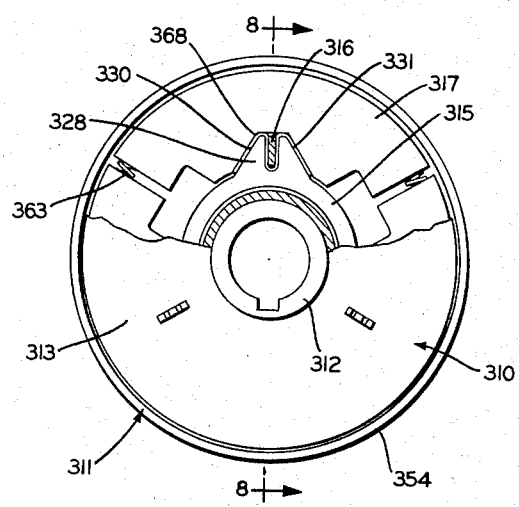
Figure 8:
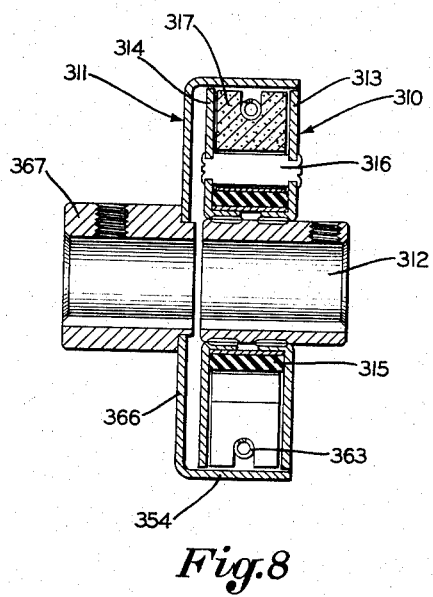
Figure 9:
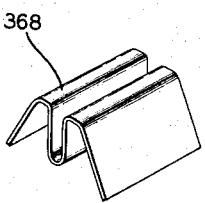

By way of example, embodiments of the centrifugal clutch construction of the present invention are illustrated in the accompanying drawings forming a part hereof, wherein like numerals indicate similar parts throughout the several views, and in which:

Fig. 1 is an end view, partly broken away, showing a first embodiment of the clutch construction comprising the present invention;

Fig. 2, a vertical section, part in elevation, looking in the direction of the arrows 2—2 in Fig. 1;

Fig. 3, an end view, partially broken away, of a second embodiment of the clutch construction;

Fig. 4, a vertical section, part in elevation, looking in the direction of the arrows 4—4 in Fig. 3;

Fig. 5, an end view, partially broken away, of a third embodiment of the clutch construction;

Fig. 6, a vertical section, part in elevation, looking in the direction of the arrows 6—6 in Fig. 5;

Fig. 7, an end view, partially broken away, of a fourth embodiment of the clutch construction;

Fig. 8, a vertical section, part in elevation, looking in the direction of the arrows 8—8 in Fig. 7; and Fig. 9, a perspective view of the shim members mounted between the driving member spider and friction shoes and shown in the clutch construction in Fig. 7.

The centrifugal clutch construction comprising the present invention, as shown in Figs. 1 and 2, includes a driving member, generally indicated at 10, and a driven member, generally indicated at 11. This first embodiment of the clutch construction is shown in Figs. 1 and 2 as a pulley type clutch, but it should be understood that all of the principles of the present invention may be incorporated in either pulley type or coupling type clutches, and that it is not intended to limit the principles of the present invention to the specific forms shown.

The driving member includes a hub member 12, preferably side plates 13 and 14, a resilient spider member 15, preferably the driving lugs or bars 16 and the friction shoes or segments 17. The hub member 12 is preferably hollow and cylindrical in configuration and may include the radially extending threaded set screw opening 18 and the axially extending keyway 19, both of which are for attaching the driving member 10 to a prime mover or source of driving torque and providing a driving connection between said source and driving member 10.

The side plates 13 and 14 are preferably circular in outer configuration and generally L-shaped in cross-section, having the radially extending side portions 20 and 21 and the axially extending fastening portions 22 and 23, respectively. The outer surface of the hub member 12 is preferably knurled at axially spaced portions thereof as at 24 and 25, and the fastening portions 22 and 23 are pressed over these knurled portions 24 and 25, with the knurled portions gripping the fastening portions and maintaining the side plates 13 and 14 in radially extending axially spaced position as shown.

A spacer 26 is preferably positioned surrounding the fastening portions 22 and 23 of the side plates 13 and 14, and the spider member 15 is positioned surrounding this spacer. Thus, the spider member 15 is mounted between the side plates 13 and 14 and surrounding the spacer 26, fastening portions 22 and 23, and a portion of the hub member 12, all of which are received through the opening 27 formed substantially centrally and axially through the spider member 15.

The spider member 15 is preferably generally cylindrical in configuration and is formed of rubber or other rubber-like plastic materials having an amount of resilience to provide the flexible clutch as desired and as hereinafter described. Further, the spider member 15 is provided with a series of circumferentially spaced radially extending generally triangular projections or tangs 28 extending outwardly from the outer circumferential surface 29 thereof.

Projections 28, as stated, are preferably triangular in configuration, providing the generally radially extending side angled surfaces 30 and 31 and the generally circumferentially extending top flat surfaces 32. The driving lugs or bars 16 are received through the projections 28, preferably equally spaced from the side angled surfaces 30 and 31, and preferably extending radially inwardly from the top flat surfaces 32.

The driving lugs 16 extend between the side plates 13 and 14 and are preferably provided with reduced end portions which are received through the side plates and staked as at 33. Thus, a driving connection for transmitting torque is provided from the hub member 12 to the side plates 13 and 14, and from the side plates to the resilient spider member 15 through the driving lugs 16.

The friction shoes 17 are preferably formed as arcuate segments providing the outer circumferentially extending arcuate friction surfaces 34, the inner circumferentially extending surfaces 35 and the generally radially extending end surfaces 36 and 37. Further, shoes 17 are formed of any usual friction material of a type dependent on the particular application of the clutch construction, the type of torque load to be transmitted and the temperature conditions to be encountered.

Further, the friction shoes 17 are provided with a generally triangular recess 38 formed in the inner surface 35, extending generally radially outwardly and formed substantially midway of the circumferential length of the shoes. Thus, when the shoes 17 are positioned around the spider member 15, the recesses 38 open radially inwardly, having slightly larger dimensions than the dimensions of the projections 28, except that the depths thereof are an amount less than the radial height of the projections 28.

Shoes 17 are positioned surrounding spider member 15, with the projections 28 of member 15 received in the recesses 38 of shoes 17, so that the side angled surfaces 39 and 40 of recess 38 normally abut the side surfaces 30 and 31, respectively, of projections 28, and the inner flat surfaces 41 of recesses 38 abut the top flat surfaces 32 of projections 28. When shoes 17 are positioned engaged with the projections 28 of spider member 15, the inner surfaces 35 thereof are preferably spaced slightly from the outer circumferential surface 29 of spider member 15, to insure that the projections 28 are received fully within the recesses 38.

The clutch construction described in detail above is preferably common to all of the embodiments shown in the drawings and illustrating the preferred embodiments of the present invention. The first and second embodiments include modifications for using various types of resilient means for resisting the radially outward movement of the friction shoes 17 caused by the centrifugal force created by rotating the driving member 10, the third embodiment provides means for increasing the torque capacity of the clutch and producing unique and advantageous features therein, and the fourth embodiment provides means for reducing friction between the friction shoes 17 and the spider member 15 when the shoes 17 move from disengaged to engaged position.

In the first embodiment shown in Figs. 1 and 2, preferably right-angled cutouts or recesses 42 and 43 are formed at either end of each of the friction shoes 17. Cutouts 42 and 43 extend in a generally circumferential direction from end surfaces 36 and 37 toward the triangular recesses 38, providing the side surfaces 44 and 45, and further extend generally radially from the inner surfaces 36 of shoes 17 forming the end surfaces 46 and 47.

A first set of spring fastening holes 48 are formed in an axial direction through the friction shoes 17, spaced circumferentially from each of the end surfaces 46 and 47, and between these end surfaces and recesses 38. Further, a second set of spring fastening holes 49 are formed extending in a circumferential direction extending from end surfaces 46 and 47 to and opening into the first spring fastening holes 48, at points substantially centrally of end surfaces 46 and 47.

Thus, when the friction shoes 17 are positioned mounted on the spider member 15, as shown in Fig. 1, the cutouts of one shoe will open toward the cutouts of the next adjacent shoes, while the end surfaces 36 and 37 are normally spaced slightly from the end surfaces of the next adjacent shoes. Pairs of tension springs 50 and 51 may be positioned within each of the combined cutouts of adjacent shoes 17, as shown.

Further, the fastening portions of each of these springs 50 and 51 may be received into the spring fastening holes 48 in an axial direction and then into the second spring fastening holes 49 in a generally circumferential direction, extending back toward the springs 50 and 51. When pairs of springs 50 and 51 are used as shown in Fig. 1, it is preferable to form spaced slots 52 and 53 in the side plates 13 and 14, respectively, adjacent the tension springs 50 and 51, so that there is no danger that the side plates restrict the movement of the springs 50 and 51 and thus the friction shoes 17. Also, slots 52 provide accessibility to springs 50 and 51 for replacement of these springs and friction shoes 17.

The driven member 11 includes a generally axially extending housing 54 having the axially and circumferentially extending inner surface 55. In the first embodiment, as shown in Fig. 2, the housing 54 is preferably integrally connected to a generally radially extending flange 56 of a V-belt pulley 57.

Pulley 57 preferably includes a generally hollow cylindrical hub portion 58 having the flange 56 secured in surrounding relation by a copper brazed fit. Further, pulley 57 also includes a second pulley flange 59 which is secured on hub portion 58 also by a copper brazed fit and spaced axially from flange 56, so that flanges 56 and 59 form a V-groove therebetween for the reception of the usual V-belt.

A preferably oil impregnated bronze or copper bushing 60 is received in portion 58 of pulley 57 by means of a press fit, so that the flanges 56 and 59, hub portion 58 and bushing 60 are formed as a complete unit and are integrally connected to the housing 54 forming the entire driven member 11. Bushing 60 of pulley 57 is received surrounding the outer circumferential surface of hub member 12 and a snap ring 61 is positioned at the outer side of bushing 60, thereby confining pulley 57 between this snap ring and the side plate 14, and positioning the inner surface 55 of housing 54 spaced radially outwardly from the outer friction surfaces 34 of friction shoes 17.

Because of bushing 60 journaling the driven member 11 on the hub member 12 of driving member 10, driving member 10 is permitted to rotate freely in reference to driven member 11 until the friction shoes 17 of the driving member 10 engage the housing 54 of the driven member 11. As before stated, this clutch construction shown in Figs. 1 and 2 forming the first embodiment of the present invention is of the pulley type, that is, with the driven member 11 journaled on the hub 12 of the driving member 10 by means of the bushing 60.

In operation of the clutch construction shown in Figs. 1 and 2, the driving member 10 may be rotated below the so-called "engagement" or "release speed" and the tension springs 50 and 51 will retain the friction shoes 17 with the recesses 38 encompassing the projections 28 of the spider member 15, thereby maintaining the outer friction surfaces 34 of shoes 17 spaced radially inwardly from the inner surface 55 of housing 54. When, however, the release speed is exceeded, the centrifugal force of the friction shoes 17 will overcome the retaining force of the tension springs 50 and 51 so that the shoes 17 will move radially outwardly into contact with housing 54.

Still further, depending on the direction of rotation, when the friction shoes 17 are engaged with the housing 54, one of the side angled surfaces 30 or 31 of the spider projections 28 will maintain contact with its matching side angled surface 39 or 40 of the friction shoe recesses 38. In this manner, torque is transmitted through the resilient spider member 15 to the friction shoes 17 into the housing 54, and ultimately to the pulley 57.

The flexible feature of the clutch construction is provided by the fact that the torque is transmitted into the friction shoes 17 from a spider member 15 formed of resilient material, so that if there is slight misalignment between the outer friction surfaces 34 of friction shoes 17 and the inner surface 55 of housing 54, this may be compensated for by the resiliency of spider member 15, without distorting or unduly stressing the other parts of the clutch, and while still maintaining a positive torque transmitting drive therebetween. Further, the self-energizing feature is provided by there being only angled surface contact between the spider member 15 and the friction shoes 17. Due to this angled surface contact, with an increase in the torque load on the clutch after engagement, a wedging effect will take place between these angled surfaces, that is, the side angled surfaces 39 or 40 of the friction shoes 17 will slide slightly outwardly along the side angled surfaces 30 or 31 of the spider member 15, depending on which surfaces are abutting and engaged.

In this manner, the torque transmitting capacity of the clutch is increased, within limits, as the driven load is increased, but after the driven load has increased over a predetermined maximum amount, the friction shoes 17 will slip on the housing 54, thereby still providing overload protection. Further, since the driving lugs 16 are positioned in the projections 28 of the spider member 15, a positive drive is maintained between the projections 28 and the friction shoes 17 while still providing flexibility for compensating for misalignment between the friction shoes 17 and the housing 54. Lugs 16 also add strength and stability to projections 28, preventing complete distortion of these projections and possible loss of driving engagement between spider member 15 and friction shoes 17.

The second embodiment of the clutch construction comprising the present invention and shown in Figs. 3 and 4 is similar to the first embodiment shown in Figs. 1 and 2, with the differences therebetween being in the positioning and the type of springs used for resisting the movement of the friction shoes radially away from the resilient spider member. In the first embodiment, sets of individual tension springs are used between ends of adjacent friction shoes, whereas in the second embodiment these sets of individual tension springs are eliminated and replaced by a circular garter spring surrounding the friction shoes.

As shown in Figs. 3 and 4, the construction of the second embodiment similarly includes the driving member 110 and the driven member 111. The driving member 110 again includes the hub member 112, side plates 113 and 114, spider member 115, driving lugs 116 and friction shoes 117.

Also, the driven member 111 includes the housing 154 and pulley 157. As in the first embodiment, the driven member 111 is journaled on the driving member 110 forming a pulley type clutch.

In the second embodiment, the outer friction surfaces 134 of the friction shoes 117 are provided with circumferentially extending spring slots 162. The garter spring 163 is received in the spring slots 162 surrounding all the friction shoes 117 and normally maintaining the projections 128 of the spider member 115 fully engaged in the recesses 138 of the friction shoes 117.

The clutch construction of the first and second embodiments operate in a similar manner, since the garter spring 163 operates in substantially the same manner as the pairs of tension springs used in the first embodiment. Garter springs, however, such as the garter spring 163 have certain advantages over the pairs of individual tension springs of the first embodiment in some applications of the clutch construction, whereas in other applications the individual tension springs are superior to the single garter spring.

When the clutch construction is to be used for light duty gasoline engine applications where relatively low speeds and only slight heat is encountered, or on electric motor applications where little, if any, heat is encountered and again low speeds, the garter spring shown in the second embodiment in Figs. 3 and 4 is preferred to the individual tension springs shown in the first embodiment in Figs. 1 and 2. The single garter spring is lower in original cost and cost of replacement than the greater number of individual tension springs and therefore provides a more economical construction.

However, where the clutch construction is to be used for heavy duty gasoline engine applications such as power chain saws, which require a high speed, and it is necessary to protect the springs against the high temperatures encountered, the individual tension springs are preferred over the garter springs. The heat is readily transmitted to the garter springs positioned at the outer surfaces of the shoes causing possible damage thereto, while this is not true of the individual tension springs, which are somewhat protected from the heat, since they are positioned almost beneath the friction shoes and thereby insulated. Further, slots 52 formed in side plates 13 and 14 when the individual tension springs are used, provide ventilation for these springs, thereby decreasing any effect of heat thereon.

The third embodiment of the clutch construction is shown in Figs. 5 and 6 and is very similar to the second embodiment shown in Figs. 3 and 4. The principal difference between these embodiments is a provision in the third embodiment of means for increasing the torque capacity of the clutch construction without increasing the size thereof, which means may be used in the alternative to permit a considerable increase in the release speed of the clutch while maintaining the same torque capacity and without otherwise changing the clutch, such as increased size or the like.

As shown in Figs. 5 and 6, the clutch construction of the third embodiment similarly includes a driving member 210 and a driven member 211. Further, the driving member 210 similarly includes the hub member 212, the side plates 213 and 214, the spider member 215, the driving lugs 216, the friction segments 217 and the garter spring 263.

Also, the driven member 211 includes the housing 254 and the pulley 257. As in the first two embodiments, the driven member 211 is journaled on the driving member 210 forming a pulley type clutch.

As shown in Fig. 5, in the third embodiment the end portions of the friction shoes 217 are formed with angled wedge surfaces 264. Thus, when the friction shoes 217 are mounted on the spider member 215, generally triangular recesses are formed between adjacent shoes 217 inward of garter spring 263 and outward of the outer circumferential surface 229 of spider member 215, decreasing in width from surface 229 outwardly toward spring 263.

Preferably, generally cylindrical metal weight members 265 are positioned adjacent and abutting the wedge surfaces 264, with the axis thereof extending generally parallel to the axis of the driving hub member 212. When the friction shoes 217 are in normal position, not engaged with the housing 254, the weight members 265 are retained between the wedge surfaces 264 of the friction shoes 217 and the outer circumferential surface 229 of the spider member 215.

When the release speed of the clutch is reached and the centrifugal force of the friction shoes 217 overcomes the retaining force of the garter spring 263, the friction shoes 217 will move radially outwardly to engage the housing 254, and the centrifugal force of the weight members 265 will cause them to also move radially outwardly, causing the weight members 265 to remain abutting the wedge surfaces 264 of the friction shoes 217. Also, a wedging action will take place between the rounded outer surface of the weight members 265 and the wedge surfaces 264, thereby greatly increasing the torque transmitting capacity of the clutch far beyond the increase in centrifugal force caused by adding these weight members 265.

Thus, due to the wedging action of the weight members 265, by the use of these weight members it is possible to use a considerably stronger garter spring 263, thereby greatly raising the release speed of the clutch, while at the same time, once the clutch engages, the same maximum torque capacity is produced. This feature of the third embodiment is particularly beneficial for electric motor applications, since the release speed may be raised very close to the running speed of the motor, thereby permitting the electric motor, upon starting, to nearly, if not completely, reach full running speed before the driven load is connected thereto by the clutch. In this manner any decrease in the speed of the motor and the resulting high starting load thereon, caused by the engagement of the clutch, is almost completely eliminated.

Although it is preferred to use weight members 265 formed of metal and in the cylindrical configurations shown in Figs. 5 and 6, it is not intended to limit the principles of the present invention to the exact configurations shown nor to metal. Depending on the particular application, it is possible to use various types of metals or other materials, depending on the density and resulting wedging action required. It is also possible to use weight members of other shapes such as spherical or triangular with similar results being obtained.

The fourth embodiment of the clutch construction is shown in Figs. 7, 8 and 9 and again is very similar to the second embodiment shown in Figs. 3 and 4. The principal difference between the second and fourth embodiments is that in the fourth embodiment means is provided for reducing the friction between the spider member and the friction shoes when the friction shoes move radially outwardly of the spider member during engagement of the clutch.

As shown in Figs. 7 through 9, the fourth embodiment of the clutch construction similarly includes the driving member 310 and the driven member 311. The driving member similarly includes the hub member 312, side plates 313 and 314, spider member 315, driving lugs 316, friction shoes 317 and garter spring 363.

Also, the driven member 311 includes a similar housing 354, but in this fourth embodiment, different from the second and the other embodiments, the housing member 354 is integrally connected to a radially extending flange member 366, which is pressed on a driven hub 367. Thus, in the fourth embodiment the clutch construction is in the form of a coupling type clutch and may be directly connected to a driven load rather than being connected to said load through a V-belt as in the first three embodiments.

The major distinction of the basic construction of the fourth embodiment is, however, provided by the shim members 368, which are mounted over the side angled surfaces 330 and 331 of the spider projections 328. Also, these shim members extend beneath, that is, radially inwardly of the driving lugs 316.

One of the shim members 368 is shown separate from the clutch construction and in perspective view in Fig. 9. These shim members are preferably formed from relatively thin smooth metal in the order of about .006" thickness, providing a smooth surface over which the friction shoes 317 may move, but yet providing flexibility so that the shim members 368 may move with the resilient spider member 315, thereby retaining the advantages of flexibility provided by the spider member being formed from resilient material.

Although the various embodiments illustrated in Figs. 1 through 9 have each shown different features of the clutch construction comprising the present invention, it should be understood that these features can be combined in a single clutch as desired. For instance, the shim members of the fourth embodiment could be included in any of the clutches of the first three embodiments. Further, the first three embodiments, which are shown as pulley type clutches, could be constructed as coupling type clutches shown in the fourth embodiment, or the fourth embodiment could be constructed as a pulley type clutch, without departing from the principles of the present invention.

Still further, the means included in the construction of the third embodiment shown in Figs. 5 and 6, for increasing the torque capacity of the clutch construction without increasing the size thereof, could be included in the construction of the first embodiment shown in Figs. 1 and 2, in which separate tension springs are used for normally retaining the friction shoes from engagement with the driven member housing. It would merely be necessary to provide the generally triangular recesses between the ends of adjacent shoes radially outwardly of these individual tension springs and, if necessary, the radial width of the friction shoes could be increased to allow for such construction. As shown in all of the embodiments, despite the particular alterations made to include the features of any of the embodiments, the self-energizing and flexible features of the clutch are always present therein.

The principles of the present invention always provide a clutch construction in which there is a smooth engagement and also a self-energizing feature, but still overload protection is provided beyond a predetermined torque load. These features are provided by the flexible spider member, which forms the torque transmitting body between the main portion of the driving member and the friction shoes which engage the driven member, and the particular configuration of the projections formed on the spider member and the recesses formed in the friction shoes.

By providing the resilient spider member, the shock of the friction shoes engaging the driven housing is cushioned and is therefore not transmitted to the solid side plates and hub of the driving member. Also, the fact that the projections on the spider member are tapered and tapered recesses are formed in the friction shoes, the surfaces of the projections and recesses form a wedging action as the driven load is increased, but this wedging action can only increase the torque transmitting capacity of the clutch to a point which can be predetermined, and by construction the clutch in this manner to suit the particular prime mover that is supplying torque to the driving member, it is possible to provide full overload protection for this prime mover.

The spider member of the clutch construction may be formed of highly resilient material, that is, relatively soft, or may be formed of relatively hard material with only a slight amount of resiliency, depending on the flexibility of the clutch construction and the cushioning effect desired for the particular application. This change in the resiliency of the spider member may be made without greatly affecting the torque transmitting capacity of the clutch because of the driving lugs or bars which pass through the projections on the spider member and are attached to the side plates of the clutch construction, since these bars prevent extreme distortion of the projections on the spider member, thereby insuring that there is always a torque transmitting connection between the spider member and the friction shoes.

Thus, the centrifugal clutch construction comprising the present invention provides a centrifugal clutch construction which overcomes the difficulties of the prior constructions as discussed above; which does not positively lock up nor provide an abrupt engagement; which is flexible and self-energizing but yet provides overload protection; which includes a resilient spider member which is engaged with and transmits torque to the friction shoes or elements of the clutch; which includes a resilient spider for transmitting torque to the friction shoes, but which is constructed so that there is a minimum of stress on the spider as a result of such torque transmission; which includes a resilient spider for transmitting torque to the friction shoes, but which is constructed in such a way that highly resilient material may be used to form the spider without affecting such torque transmission; which has a plurality of friction shoes, and which may incorporate either individual tension springs between adjoining friction shoes for regulating the radial movement thereof caused by centrifugal force, or may incorporate a garter spring surrounding all of the friction shoes with only a slight modification of the friction shoes being required by such substitution; which includes means for cheaply and conveniently providing a clutch having a high release or engagement speed near the running speed of the device with which the clutch is used, but yet having a high torque transmitting capacity when engaged; which includes a resilient spider for transmitting torque to the friction shoes thereof, and also includes means for reducing friction between said spider and shoes; and which provides all of the above advantageous features, yet is relatively simple in construction and economical to fabricate.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of construction shown.

Having now described the invention, the construction, operation and use of preferred embodiments thereof, and the advantageous new and useful results obtained thereby, the new and useful construction and reasonable mechanical equivalents thereof obvious to those skilled in the art are set forth in the appended claims.

I claim:

1. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least certain of the side surfaces of at least certain of one of the spider projections and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said certain wedge-shaped side surfaces when engaged while the friction means is engaged with the driven member causing a wedging action between the respective projection and recess side surfaces providing a self-energizing clutch construction, and spring means engaged with the friction means normally holding the friction means out of engagement with the driven member.

2. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least one of the same side surfaces of each of at least one of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces when engaged while the friction means is engaged with the driven member causing a wedging action between the projection and recess side surfaces providing a self-energizing clutch construction, and spring means engaged with the friction means out of engagement with the driven member.

3. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least one of the same side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces when engaged while the friction means is engaged with the driven member causing a wedging action between the projection and recess side surfaces providing a self-energizing clutch construction, and spring means engaged with the friction means normally holding the friction means out of engagement with the driven member.

4. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projection and friction means recesses having generally radially extending side surfaces with the recess side surfaces being positioned adjacent the projection side surfaces for abutting engagement therewith, both of the side surfaces of each of at least one of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, and spring means engaged with the friction means normally holding the friction means out of engagement with the driven member.

5. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projection and friction means recesses having generally radially extending side surfaces with the recess side surfaces being positioned adjacent the projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, and spring means engaged with the friction means normally holding the friction means out of engagement with the driven member.

6. Centrifugal clutch construction including a driving member and a driven member, a spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces, the spider projections terminating outwardly in outer end portions, driving bar means received through the spider projection outer end portions adjacent the spider projection outer extremities and spaced from the projection side surfaces for connecting the spider with the driving member for rotation therewith, the recess side surfaces being positioned adjacent the projection side surfaces for abutting engagement therewith, at least one of the same side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces when engaged while the friction means is engaged with the driven member causing a wedging action between the projection and recess side surfaces providing a self-energizing clutch construction, and spring means engaged with the friction means normally holding the friction means out of engagement with the driven member.

7. Centrifugal clutch construction including a driving member and a driven member, a spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces, the spider projections terminating outwardly in outer end portions, driving bar means received through the spider projection outer end portions adjacent the spider projection outer extremities and spaced from the projection side surfaces for connecting the spider with the driving member for rotation therewith, the recess side surfaces being positioned adjacent the projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, and spring means engaged with the friction means normally holding the friction means out of engagement with the driven member.

8. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least certain of the side surfaces of at least certain of one of the spider projections and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said certain wedge-shaped side surfaces when engaged while the friction means is engaged with the driven member causing a wedging action between the respective projection and recess side surfaces providing a self-energizing clutch construction, the friction means having end portions adjacent the end portions of adjacent friction means, the friction means having recesses formed therein at the end portions thereof opening toward adjacent friction means and covered radially outwardly by said friction means, at least one tension spring positioned in each recess of the friction means, and each spring being operably engaged with and between its associated adjacent friction means for normally holding the friction means out of engagement with the driven member.

9. Centrifugal clutch construction including a driving member and a driven member, the driving member including a spider, the spider having spaced resilient projections extending generally radially therefrom, friction element means having recesses formed therein, the friction means being detachably engaged one over each of the spider projections with said projections being received in the friction means recesses, the spider projection and friction means recesses having generally radially extending side surfaces with the recess side surfaces being positioned adjacent the projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, each friction means having end portions adjacent the end portions on adjacent friction means, each friction means having recesses formed therein at the end portions thereof opening toward each adjacent friction means and covered radially outwardly by said friction means, at least one tension spring positioned partially in each recess of each friction means and partially in the recesses of the adjacent friction means, and each spring being operably engaged with each of its adjacent friction means for normally holding the friction means out of engagement with the driven member.

10. Centrifugal clutch construction including a driving member and a driven member, the driving member including a resilient spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least certain of the side surfaces of at least certain of one of the spider projections and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said certain wedge-shaped side surfaces when engaged while the friction means is engaged with the driven member causing a wedging action between the respective projection and recess side surfaces providing a self-energizing clutch construction, each of the friction means having end portions adjoining the end portions of adjacent friction means, at least certain of the end portions of certain of the friction means having wedge-shaped recesses formed therein forming wedge-shaped recesses between adjacent end portions of adjacent friction elements opening toward the spider, weight members received in said wedge-shaped recesses formed between adjoining end portions and confined in said recesses by the friction means and spider, the weight members having arcuate surfaces abutting the adjacent friction means and being free of connection with the driving member other than by abutment, and spring means engaged with the friction means normally holding the friction means out of engagement with the driven member.

11. Centrifugal clutch construction including a driving member and a driven member, the driving member including a resilient spider, the spider having spaced resilient projections extending generally radially therefrom, friction element means having recesses formed therein, the friction means being detachably engaged one over each of the spider projections with said projections being received in the friction means recesses, the spider projection and friction means recesses having generally radially extending side surfaces with the recess side surfaces being positioned adjacent the projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, each of the friction means having end portions adjoining the end portions of adjacent friction means, at least certain of the end portions of certain of the friction means having wedge-shaped recesses formed therein forming wedge-shaped recesses between adjacent end portions of adjacent friction elements opening toward the spider, weight members received in said wedge-shaped recesses formed between adjoining end portions and confined in said recesses by the friction means and spider, the weight members having arcuate surfaces abutting the adjacent friction means and being free of connection with the driving member other than by abutment, and spring means engaged with the friction means normally holding the friction means out of engagement with the driven member.

12. Centrifugal clutch construction including a driving member and a driven member, the driving member including a resilient spider, the spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces with the recess side surfaces being positioned adjacent the projection side surfaces for abutting engagement therewith, at least certain of the side surfaces of at least certain of one of the spider projections and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said certain wedge-shaped side surfaces when engaged while the friction means is engaged with the driven member causing a wedging action between the respective projection and recess side surfaces providing a self-energizing clutch construction, each of the friction means having end portions adjoining the end portions of each of the adjacent friction means, each of the end portions tapering radially outwardly in a direction toward the adjoining end portions of adjacent friction means forming triangular recesses between the end portions of adjacent friction means formed substantially one-half by each friction means and opening toward the spider, weight members received in said triangular recesses and being confined in said recesses by the friction means and spider, said weight members having arcuate surfaces abutting the friction means and being free of connection with the driving member other than by abutment, and spring means engaged with the friction means normally holding the friction means out of engagement with the driven member.

13. Centrifugal clutch construction including a driving member and a driven member, the driving member including a resilient spider, the spider having spaced resilient projections extending generally radially therefrom, friction element means having recesses formed therein, the friction means being detachably engaged one over each of the spider projections with said projections being received in the friction means recesses, the spider projection and friction means recesses having generally radially extending side surfaces with the recess side surfaces being positioned adjacent the projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between the projection and recess side surfaces providing a self-energizing clutch construction, each of the friction means having end portions adjoining the end portions of each of the adjacent friction means, each of the end portions tapering radially outwardly in a direction toward the adjoining end portions of adjacent friction means forming triangular recesses between the end portions of adjacent friction means formed substantially one-half by each friction means and opening toward the spider, weight members received in said triangular recesses and being confined in said recesses by the friction means and spider, said weight members having arcuate surfaces abutting the friction means and being free of connection with the driving member other than by abutment, and spring means engaged with the friction means normally holding the friction means out of engagement with the driven member.

14. Centrifugal clutch construction including a driving member and a driven member, a spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces, the spider projections terminating outwardly in outer end portions, said projection outer end portions having recesses formed therein at and opening outwardly of the spider projection outer extremities and spaced from the projection side surfaces, driving bar means received in the projection outer end portion recesses for connecting the spider with the driving member for rotation therewith, smooth flexible shim members mounted on each of the spider projections against the projection side surfaces and engaged radially inwardly beneath the driving bar means, the friction means recess side surfaces being positioned adjacent the the shim members and projection side surfaces for abutting engagement therewith, at least one of the same side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projection and friction means recess side surfaces and despite outward movement of the friction means, the friction means moving radially outward to engage the driven member independent of any outward movement of said spider projections, siad wedge-shaped side surfaces when engaged while the friction means is engaged with the driven member causing a wedging action between the spider projection and friction means recess side surfaces providing a self-energizing clutch construction, and spring means engaged with the friction means normally holding the friction means out of engagement with the driven member.

15. Centrifugal clutch construction including a driving member and a driven member, a spider having spaced resilient projections extending generally radially therefrom, friction element means having recesses formed therein, the friction means being detachably engaged one over each of the spider projections with said projections being received in the friction means recesses, the spider projections and friction means recesses having generally radially extending side surfaces, the spider projections terminating outward in outer end portions, said projection outer end portions having recesses formed therein at and opening outwardly of the spider projection outer extremities and spaced from the projection side surfaces, driving bar means received in the projection outer end portion recesses for connecting the spider with the driving member for rotation therewith, smooth flexible shim members mounted on each of the spider projections against the projection side surfaces and engaged radially inwardly beneath the driving bar means, the friction means recess side surfaces being positioned adjacent the shim member and projection side surfaces for abutting engagement therewith, both of the side surfaces of each of the spider projection and friction means recesses being formed generally wedge-shaped, the friction means being engageable with the driven member upon radially outward movement in response to centrifugal force upon rotation of the driving member, the friction means remaining engaged by abutment with the spider projections at all times through an abutting relationship between certain of the spider projections and friction means recess side surfaces and despite outward movement of the friction means, the friction means moving radially outward to engage the driven member independent of any outward movement of said spider projections, said wedge-shaped side surfaces while the friction means is engaged with the driven member causing a wedging action between spider projection and friction means recess side surfaces providing a self-energizing clutch construction, and spring means engaged with the friction means normally holding the friction means out of engagement with the driven member.

References Cited in the file of this patent

UNITED STATES PATENTS

| 2,350,810 | Pentz | June 6, 1944 |
| 2,370,199 | Schuckers | Feb. 27, 1945 |
| 2,375,909 | Fawick | May 15, 1945 |
| 2,386,071 | Stephenson | Oct. 2, 1945 |
| 2,396,637 | Bruestle | Mar. 19, 1946 |
| 2,455,086 | Papas | Nov. 30, 1948 |
| 2,753,967 | Bowers | July 10, 1956 |

FOREIGN PATENTS

| 547,762 | Germany | Apr. 2, 1932 |